United States Patent [19]

Hicks et al.

[11] 4,065,705

[45] Dec. 27, 1977

[54] SCR CONTROLLED UNIVERSAL MOTOR

[75] Inventors: William R. Hicks, Spencerport; Homer R. Miller, Rochester, both of N.Y.

[73] Assignee: General Electric Company, Bridgeport, Conn.

[21] Appl. No.: 662,959

[22] Filed: Mar. 1, 1976

[51] Int. Cl.[2] .............................................. H02P 7/08
[52] U.S. Cl. ..................................... 318/245; 310/158
[58] Field of Search ................. 310/158; 318/245, 244

[56] References Cited

U.S. PATENT DOCUMENTS

| | | | |
|---|---|---|---|
| 3,058,044 | 10/1962 | Herr ...................... | 318/245 |
| 3,286,150 | 11/1966 | Wilson et al. ............ | 318/245 |
| 3,452,264 | 6/1969 | Turtle ..................... | 318/245 |
| 3,924,169 | 12/1975 | Craft et al. ............. | 318/245 |

*Primary Examiner*—Herman T. Hohauser
*Attorney, Agent, or Firm*—John F. Cullen; George R. Powers; Leonard J. Platt

[57] ABSTRACT

In an SCR circuit controlled universal motor, means is provided for smooth speed control at all speed settings especially low settings which comprises a series wound stator field as part of the motor and at least one closed conductor loop of wire encircling the stator magnetic flux path.

10 Claims, 4 Drawing Figures

SCR CONTROLLED UNIVERSAL MOTOR

FIELD OF THE INVENTION

The invention is directed to a means of providing a smooth and variable speed control at all speed settings in an SCR circuit controlled universal motor.

DESCRIPTION OF THE PRIOR ART

A universal motor is used in many applications because of its flexibilty and low cost and is especially used in many household appliances. It consists of a seies-wound motor that is designed to operate at approximately the same speed and output on direct current or on single-phase alternating current of not more than 60 hertz and approximately the same r.m.s. voltage. One method of providing variable speed control in universal motors is by means of a solid state control employing silicon controlled rectifier (SCR) circuit with an adjustable potentiometer or a means of switching resistors or as generally shown in Pat. Nos. 3,452,264 and 3,286,150. A drawback of the simple SCR control circuit is that its characteristics and response are dependent upon the motor's residual induced voltage which bucks the SCR's gate current flow causing the gate voltage to increase as necessary to fire the SCR at the firing angle necessary to maintain a particular steady motor speed. When the residual voltage is too low or unstable, poor speed regulation results. Consequently, universal motors, in low speed applications, were controlled by other means than SCR control circuits and even then there were problems in the low load, high speed region in trying to control the speed. At very light or no loads, trying to hold the speed down is a very difficult thing to do and there is a tendency to get erratic action whereby the motor speed increases and then drops in a virtually uncontrollable manner until load is applied. In certain applications, for example, in household mixers, very light loads are almost equivalent to no load and this may occur in operations such as whipping egg whites or mixing fruit drinks or similar light load operations. Trying to regulate the SCR control down to such low speeds necessarily results in erratic low speeds and the motor exhibits "cogging" which is defined as non-uniform angular velocity because the armature coil of the motor tends to speed up when it enters the magnetic field produced by the field coils and to slow down when leaving it. This is especially apparent at low speeds, and the fewer the coils, the more noticeable the cogging becomes. Thus, if exact and smooth control is desired, either more expensive control means must be used or a different type motor is required. The prior art has not provided a simple and inexpensive arrangement by which an SCR circuit controlled universal motor may provide smooth speed control at all speed settings and especially in the low speed, low load range.

SUMMARY OF THE INVENTION

The invention is directed to an SCR circuit controlled universal motor which is equipped with means for providing smooth speed control at all speed settings that comprises a series-wound stator field in the motor and having at least one closed conductor loop of wire encircling the stator magnetic flux path. Preferably a pair of separate closed conductor loops encircle the magnetic path between the poles although at least one loop does improve the speed control. The invention lies both in the structure to provide the smooth speed control and in the method by which such control is obtained.

BRIEF DESCRIPTION OF THE DRAWING

Referring to FIG. 1, there is shown a typical application of the invention to an electric household mixer. The mixer is used for illustration only since it has the problem of very light whipping load at low speed but it should be apparent that the invention is applicable to any universal motor regardless of its application.

FIG. 1 illustrates a typical electric mixer having a handle 10 and speed control/beater ejection means 12 and housing 14. Within the housing a conventional universal motor has the stator yoke 16 formed of laminations with pole pieces 18 (FIGS. 2 and 3) around which field coils 20 are wound and a central armature 22 is supported all in a well-known manner. The motor 16 may be held in position by a strap 24 fastened to the housing.

This is the general arrangement in many applications such as the electric mixer shown. In such an application, when the universal motor speed is controlled by an SCR circuit, smooth operation at low speeds is very erratic. In such a circuit the SCR fires only over half a cycle but this provides too much power for the low speed control. Thus, it is desirable to extract only a portion of the half cycle as power for low speed operation.

Figure 1:
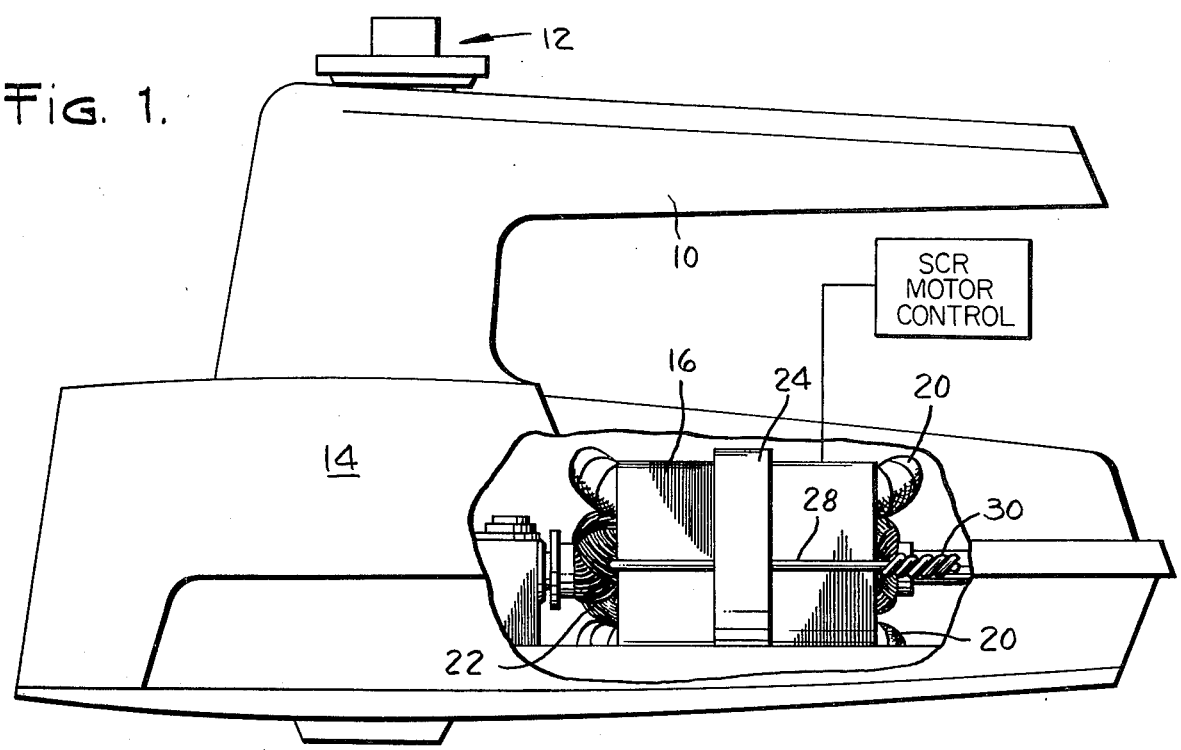
FIG. 1 is a view, partially broken, illustrating the invention as applied to a household mixer.
Figure 2:
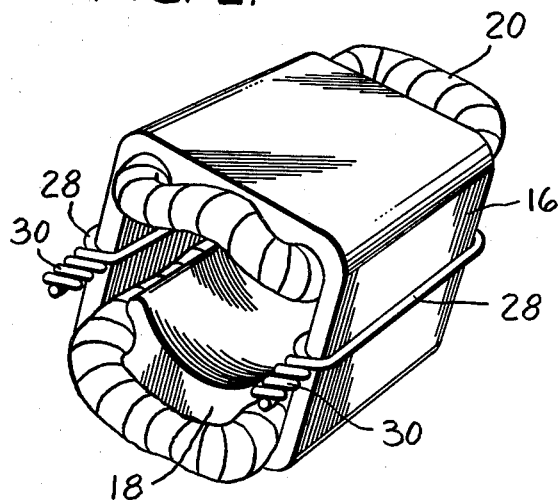
FIG. 2 is a partial perspective showing a universal motor with a pair of separate closed loops between the poles on opposite sides of the field.
Figure 3:
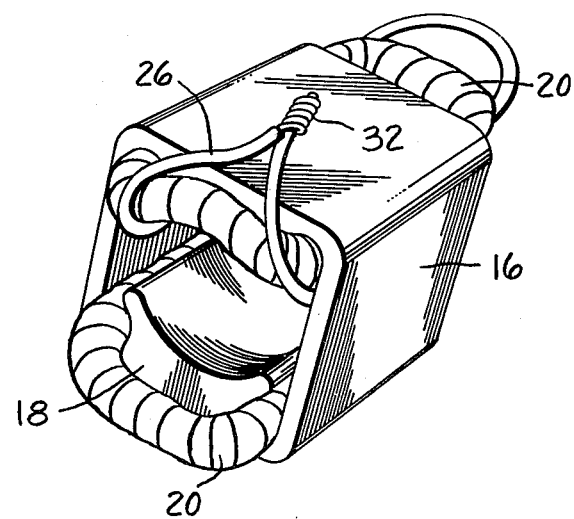
FIG. 3 shows a single loop encircling one pole face of the universal motor.
Figure 4:
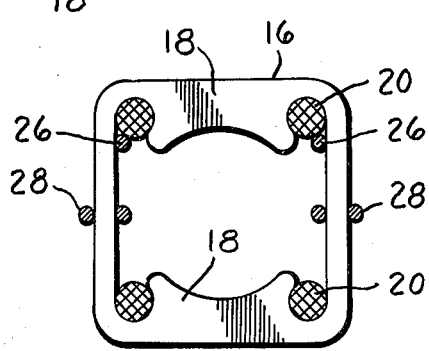
FIG. 4 is a cross-section illustrating the location of the loop conductors of both FIG. 2 and 3.

In accordance with the invention, this is done by adding at least one and preferably a pair of heavy copper, wire short-circuiting coils and adding these coils to the field iron to encircle the magnetic flux path. The invention proposes the addition of at least one closed coil 26 around one pole face 18 as shown in FIGS. 3 and 4. This arrangement has been found to improve the firing characteristics of the SCR control circuit so that, in effect, the coil 26 brakes or "soaks up" some of the energy under the half wave of the sine curve. An alternate and preferable means of improving the speed control is the use of two separate closed conductor loops 28 wound first around one portion of the stator yoke between the field poles and then a separate second wire is wound around the opposing portion of the stator yoke between the field poles 18 on opposite sides of the stator as shown in FIGS. 1, 2 and 4. In other words, separate closed loops encircle the stator yoke between the field poles.

Both these arrangements of FIGS. 2 and 3 have provided very smooth and fine speed control under no load or very light load in the universal SCR speed controlled motor.

The theory of operation is thought to be equivalent to the conductor loops or coils 26 and 28 in dampening or "soaking up" some of the generated energy. The closed conductor coils 26 and 28, located as shown in FIGS. 2 and 3, in effect, act as damper windings because there is a voltage generated in the coils due to the armature rotation and the current that flows in the coils then acts as an energy drain. The voltage across the coils and current through them causes the coils to impose a light electromagnetic load on the armature. As the armature turns it creates its magnetic field even during a half cycle when the voltage is off because of the residual magnetism in the iron. That magnetic field sweeps past the closed conductor coils 26 and 28 inducing current flow in the closed coils and the combination results in an energy loss in the damper coils 26 and 28. It appears that the coils simply act as a drain for the armature energy or in other words, the coils are soaking up some energy under the half sine wave. Thus, the energy which is not being used in the load is being consumed in the damper windings so that the closed conductors provide a means of getting rid of some of the energy without the speed of the motor rising perceptibly. In effect, the energy is abstracted as heat in the damper windings so that as the current goes through another cycle, the SCR fires properly.

While both arrangements of FIGS. 2 and 3 appear to improve the low speed operation, FIG. 2 is the preferable arrangement because its oscilloscope traces show a more even smooth firing of the SCR.

The above is an attempt to explain the operation of the invention although there may be further and additional explanations. It is necessary that the conductors 26, 28 be secured closed, preferably copper loops simply twisted together at 32 and 30 respectively and while no given size is necessary to improve operation, it has been found that copper wire smaller than No. 10 gauge has reduced effectiveness. Obviously, any suitable means to secure the wire ends together may be used such as soldering, welding, staking, conventional connectors, or simply plain twisting as shown. As shown in FIGS. 2 and 3, the loops for conductors 26 and 28 are generally parallel to the axis of rotation of the motor armature 22.

It should be apparent that the invention resides in both the specific apparatus by modifying a universal motor as described and in the method of providing smooth speed control at all settings of an SCR circuit controlled universal motor wherein the method comprises winding at least one metallic conductor (loop) wire around the stator magnetic flux path as shown in FIGS. 2 and 3 and the loop is then closing it in any simple manner such as by twisting each wire separately at its respective ends to twist the wire ends together at 30 in the dual separate opposite field conductor modification of FIG. 2 and at 32 in the single conductor modification. In both cases of winding the stator, the wire thus forms a closed loop generally parallel to the axis of rotation of the motor armature.

While we have attempted to explain the operation of this successful means and method of controlling speed in an SCR controlled universal motor at all speeds and especially at low speed, low load settings, it may be that there are other explanations as to the theory of operation. The method of control and the modification to a universal motor for this control has proved effective by the use of the closed loops as described.

While there have been described preferred forms of the invention, equivalent variations may be possible in light of the above teachings. It is therefore to be understood that, within the scope of the appended claims, the invention may be practiced otherwise than as specifically described, and the claims are intended to cover such equivalent variations.

I claim:

1. In an SCR circuit controlled universal motor, means for providing smooth speed control at all speed settings comprising,
    a series wound stator field in said motor, and
    at least one closed conductor loop of wire encircling the stator magnetic flux path.

2. Apparatus as described in claim 1 wherein said conductor is a closed copper loop.

3. Apparatus as described in claim 2 wherein said copper loop is 10 gauge or greater.

4. Apparatus as described in claim 1 wherein the conductor loop encircles the poles of the motor at each end thereof.

5. Apparatus as described in claim 1 wherein separate closed conductor loops encircle the stator yoke between the poles.

6. Apparatus as described in claim 1 wherein the conductor loop is generally parallel to the axis of rotation of the motor armature.

7. The method of providing smooth speed control at all speed settings of an SCR circuit controlled universal motor comprising,
    winding at least one metallic conductor wire around the stator magnetic flux path, and
    securing the wire ends together to form a closed loop.

8. The method of providing smooth speed control at all speed settings of an SCR circuit controlled universal motor comprising,
    winding at least one copper wire conductor of 10 gauge or greater around the stator magnetic flux path, and
    securing the ends of said wire together to form a closed loop.

9. The method described in claim 8 wherein the winding is done around first one portion of the stator yoke between the field coils and then a separate second wire is wound around the opposing portion of the stator yoke between the field coils, and
    securing each wire separately at its respective ends forming separate closed coils.

10. The method of claim 8 wherein the winding is done in a direction generally parallel to the axis of rotation of the motor armature.

* * * * *